US010420094B2

(12) United States Patent
Chen et al.

(10) Patent No.: US 10,420,094 B2
(45) Date of Patent: Sep. 17, 2019

(54) METHODS AND SYSTEM FOR RESOURCE MANAGEMENT IN TTI (TRANSMISSION TIME INTERVAL) BUNDLING FOR IMPROVED PHASE CONTINUITY

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1103 days.

(21) Appl. No.: 14/157,202

(22) Filed: Jan. 16, 2014

(65) Prior Publication Data

US 2014/0198664 A1    Jul. 17, 2014

Related U.S. Application Data

(60) Provisional application No. 61/753,860, filed on Jan. 17, 2013.

(51) Int. Cl.
*H04W 72/04* (2009.01)
*H04L 1/18* (2006.01)
(Continued)

(52) U.S. Cl.
CPC ....... *H04W 72/0446* (2013.01); *H04L 1/0015* (2013.01); *H04L 1/189* (2013.01);
(Continued)

(58) Field of Classification Search
CPC ..... H04L 1/189; H04L 1/0015; H04L 1/0009; H04W 72/0446; H04W 52/04;
(Continued)

(56) References Cited

U.S. PATENT DOCUMENTS

2005/0018656 A1*  1/2005  Rudolf .................. H04W 52/08
                                                    370/352
2009/0268695 A1* 10/2009  Zhao ...................... H04L 5/0048
                                                    370/336
(Continued)

FOREIGN PATENT DOCUMENTS

CN    101237260 A    8/2008
CN    101998585 A    3/2011
(Continued)

OTHER PUBLICATIONS

International Search Report and Written Opinion—PCT/US2014/011969—ISA/EPO—dated Aug. 28, 2014.
(Continued)

*Primary Examiner* — Rownak Islam
(74) *Attorney, Agent, or Firm* — Patterson & Sheridan, L.L.P.

(57) ABSTRACT

Certain aspects of the present disclosure propose methods for improving phase continuity in an uplink transmit time interval (TTI) bundle. A first method may include identifying a segment of UL subframes in the TTI bundle and maintaining substantially the same transmit power/timing/frequency when transmitting data to a node over the segment of UL subframes in the TTI bundle. Another method may include ignoring reception of downlink subframes for a duration of the TTI bundle.

20 Claims, 6 Drawing Sheets

(51) Int. Cl.
*H04W 52/38* (2009.01)
*H04L 1/00* (2006.01)
H04W 52/14 (2009.01)
H04B 17/309 (2015.01)

(52) U.S. Cl.
CPC ........... *H04W 52/38* (2013.01); *H04B 17/309* (2015.01); *H04W 52/146* (2013.01)

(58) Field of Classification Search
CPC ............. H04W 52/38; H04W 72/0413; H04W 52/146; H04W 52/08; H04B 17/309
USPC ......................................................... 370/241
See application file for complete search history.

(56) References Cited

U.S. PATENT DOCUMENTS

| 2009/0307554 | A1* | 12/2009 | Marinier | H04L 1/1812 714/748 |
|---|---|---|---|---|
| 2010/0002616 | A1 | 1/2010 | Peng et al. | |
| 2010/0067412 | A1* | 3/2010 | Kitazoe | H04L 1/1812 370/294 |
| 2010/0111068 | A1* | 5/2010 | Wu | H04L 1/1812 370/345 |
| 2011/0170483 | A1* | 7/2011 | Ishii | H04W 72/0446 370/328 |
| 2011/0280212 | A1* | 11/2011 | LV | H04W 74/002 370/329 |
| 2012/0257686 | A1* | 10/2012 | Scholand | H04L 1/0009 375/295 |
| 2013/0242889 | A1* | 9/2013 | Khoryaev | H04W 72/0413 370/329 |
| 2014/0192918 | A1* | 7/2014 | Park | H04B 7/0486 375/267 |
| 2014/0329555 | A1* | 11/2014 | Gao | H04W 52/146 455/522 |
| 2014/0362832 | A1* | 12/2014 | Rudolf | H04L 1/1822 370/336 |

FOREIGN PATENT DOCUMENTS

| CN | 102160319 A | 8/2011 |
|---|---|---|
| WO | WO-2009132204 A2 | 10/2009 |
| WO | WO-2010034354 A1 | 4/2010 |

OTHER PUBLICATIONS

European Search Report—EP16158449—Search Authority—The Hague—dated Apr. 5, 2016.

* cited by examiner

METHODS AND SYSTEM FOR RESOURCE MANAGEMENT IN TTI (TRANSMISSION TIME INTERVAL) BUNDLING FOR IMPROVED PHASE CONTINUITY

CLAIM OF PRIORITY UNDER 35 U.S.C. § 119

The present Application for Patents claims priority to U.S. Provisional Application No. 61/753,860, entitled METHOD AND SYSTEMS FOR RESOURCE MANAGEMENT IN TTI BUNDLING FOR IMPROVED PHASE CONTINUITY, filed Jan. 17, 2013, and assigned to the assignee hereof and hereby expressly incorporated by reference herein.

FIELD

Certain embodiments of the present disclosure generally relate to wireless communications and, more particularly, to resource management in transmission time interval (TTI) bundling for improved phase continuity.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support time division duplex (TDD) and/or frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station. In an FDD system, forward and reverse link transmissions are on different frequency regions.

The main focus of the traditional LTE design among other things is the improvement of spectral efficiency, ubiquitous coverage, enhanced QoS (Quality of Service) support, and the like. This typically results in high end devices, such as the state-of-art smart phones, tablets, etc. However, low cost, low rate devices need to be supported as well. Some market projections show that the number of low cost devices may largely exceed number of today's cell phones.

A study item on provision of low-cost MTC (machine type communications) UEs (User Equipments) based on LTE was done in LTE Rel-11. Particularly, the items under study included reduction of maximum bandwidth, single receive RF (Radio Frequency) chain, reduction of peak rate, reduction of transmit power, and half duplex operation.

Since the intended data rate for the low cost devices is less than 100 kbps, it is possible to operate these devices only at narrowband width, for example, to reduce costs. Two operation scenarios may be considered for the deployment of low cost devices. One straight-forward deployment scenario is to set aside some narrow bandwidth, e.g. 1.25 MHz, to support the MTC operations. In this scenario, no or little standard changes may be necessary for such operations. Another, more interesting deployment scenario is to operate low cost UEs in a large bandwidth. In this case, low cost UEs may co-exist with regular UEs. Two further possible scenarios may be considered for operation of low cost UEs in a large bandwidth. In one scenario, low cost UEs may operate over the whole available bandwidth (e.g., up to 20 MHz). This scenario may not have any impact on the standards, but it may not be helpful in reducing cost and battery power consumption. In another scenario, low cost UEs may operate over a small portion of the bandwidth.

SUMMARY

Certain aspects of the present disclosure provide a method for wireless communications by a user equipment (UE). The method generally includes identifying a transmit time interval (TTI) bundle comprising a plurality of uplink (UL) subframes for transmitting data to a node, identifying a segment of UL subframes in the TTI bundle, and maintaining transmit power when transmitting data to the node over the segment of UL subframes in the TTI bundle.

Certain aspects of the present disclosure provide a method for wireless communications by a UE. The method generally includes identifying a transmit time interval (TTI) bundle comprising a plurality of uplink (UL) subframes for transmitting data to a node, and skipping monitoring downlink subframes for a duration of the TTI bundle.

Certain aspects of the present disclosure provide an apparatus for wireless communications by a UE. The apparatus generally includes at least one processor and a memory coupled to the at least one processor. The at least one processor is generally configured to identify a transmit time interval (TTI) bundle comprising a plurality of uplink (UL) subframes for transmitting data to a node, identify a segment of UL subframes in the TTI bundle, and maintain transmit power when transmitting data to the node over the segment of UL subframes in the TTI bundle.

Certain aspects of the present disclosure provide an apparatus for wireless communications by a UE. The apparatus generally includes at least one processor and a memory coupled to the at least one processor. The at least one processor is generally configured to identify a transmit time interval (TTI) bundle comprising a plurality of uplink (UL)

subframes for transmitting data to a node, and skip monitoring downlink subframes for a duration of the TTI bundle.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, software/firmware, a combination of hardware and software/firmware, or software/firmware in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a smart phone, a tablet, an ultrabook, a netbook, a smartbook, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), The Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE/LTE-Advanced (LTE-A). For simplicity, "LTE" can refer to LTE and LTE-A. It should be noted that LTE terminology is used by way of illustration and the scope of the disclosure is not limited to LTE. Rather, the techniques described herein may be utilized in various applications involving wireless transmissions, such as personal area networks (PANs), body area networks (BANs), location, Bluetooth, GPS, UWB (ultra-wide band), RFID, and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ratio (PAPR) because of its inherent single carrier structure. SC-FDMA may be used in the uplink communications where lower PAPR greatly benefits the mobile terminal in terms of transmit power efficiency. SC-FDMA is currently a working assumption for uplink multiple access scheme in 3GPP Long Term Evolution (LTE), or Evolved UTRA.

Figure 1:
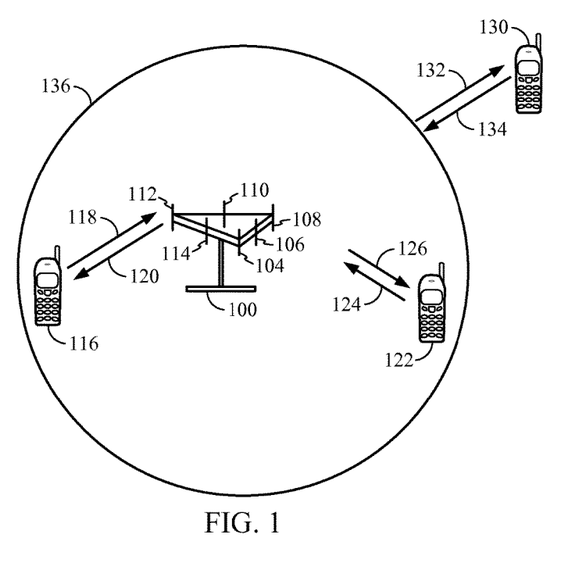
FIG. 1 illustrates a multiple access wireless communication system, in accordance with certain embodiments of the present disclosure.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 104, where antennas 106 and 104 transmit information to access terminal 122 over forward link 126 and receive information from access terminal 122 over reverse link 124. In a FDD system, communication links 118, 120, 124, and 126 may use different frequencies for communication. For example, forward link 120 may use a different frequency than that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

Access terminal 130 may be in communication with access point 100, where antennas from the access point 100 transmit information to access terminal 130 over forward link 132 and receive information from the access terminal 130 over reverse link 134. However, the access terminal 130 may be camped on the access point 100 beyond the distance (indicated by 136) that is expected by an operator when system information block (SIB) 2 parameter zeroCorrelationZoneConfig is initially configured. Such access terminals may benefit from the present methods and apparatus.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
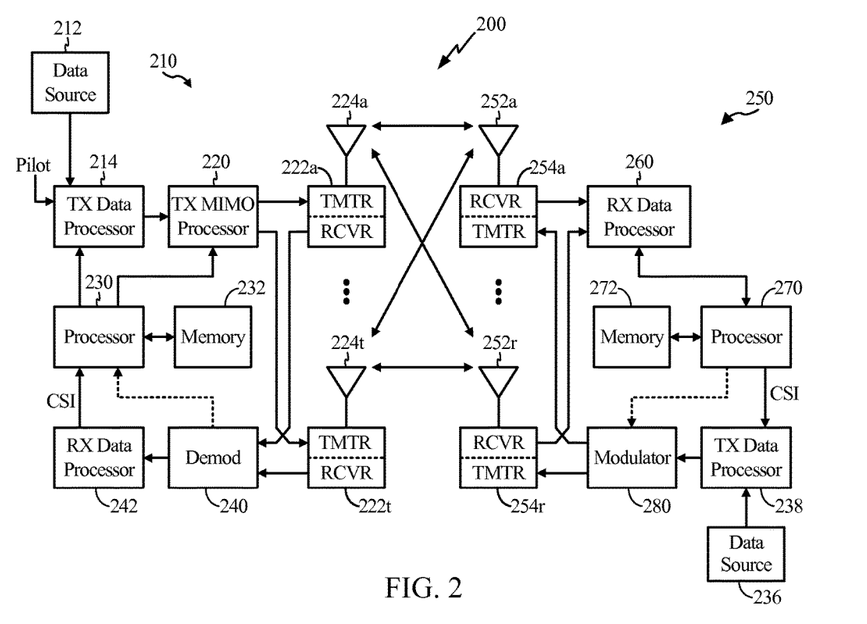
FIG. 2 illustrates a block diagram of a communication system, in accordance with certain embodiments of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. Memory 232 may store data and software/firmware for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and down converts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, de-interleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software/firmware for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Example Methods and Systems for Resource Management in TTI (Transmission Time Interval) Bundling Certain aspects of the present disclosure propose methods for improving phase continuity in an uplink transmit time interval (TTI) bundle. A first method may include identifying a segment of UL subframes in the TTI bundle and maintaining transmit power/timing/frequency when transmitting data to the base station over the segment of UL subframes in the TTI bundle. Another method may include ignoring reception of downlink subframes for a duration of the TTI bundle. The proposed methods may be used separately by user equipments or may be combined.

In LTE Rel-8/9/10, transmission time interval (TTI) bundling (or subframe bundling) may be configured on a per UE basis. The subframe bundling operation may be configured by the parameter uiBundling that is provided by higher layers. If TTI bundling is configured for a UE, the subframe bundling operation may only be applied to uplink shared channel (UL-SCH) and may not be applied to other UL signals/traffic such as uplink control information. In certain aspects, the bundling size is fixed at four subframes, i.e., PUSCH will be transmitted in four consecutive subframes. In an aspect, the same hybrid automatic repeat request (ARQ) process number may be used in each of the bundled subframes. In certain aspects, the resource allocation size is restricted to up to three resource blocks (RBs) and the modulation order is set to 2 (e.g., QPSK). In an aspect, a bundle may be treated as a single resource, therefore, a single grant and a single hybrid-ARQ acknowledgement may be used for each bundle.

In certain aspects, the motivation for TTI Bundling in LTE Rel-8 is low rate traffic. In an aspect, if voice over internet protocol (VoIP) packets may not be transmitted in a single TTI due to a low link budget for uplink, Layer 2 (L2) segmentation may be applied. For example, a VoIP packet could be segmented in four radio link control (RLC) protocol data units (PDUs) that are transmitted in four consecutive TTIs. Further, two or three HARQ retransmissions might be targeted to achieve sufficient coverage. However, this approach may have some drawbacks. Each additional segment may introduce a one byte RLC (Radio Link Control), one byte MAC (Medium Access Control) and three byte L1 CRC (Cyclic Redundancy Check) overhead, which may be up to 15% overhead assuming a 33 byte RLC SDU (Service Data Unit) size). This means that for four segments, there may be an additional L1/L2 overhead of 45%.

In addition, HARQ transmissions/retransmissions for every segment may require grants on physical downlink control channel (PDCCH) consuming significant PDCCH resources. Further, each HARQ transmission or retransmission may be followed by HARQ feedback on physical hybrid ARQ indicator channel (PHICH). Assuming a NACK-ACK error ratio of $10^{-3}$, the large number of HARQ feedback signals may lead to high packet loss probabilities. For example, if twelve HARQ feedback signals are sent, the HARQ feedback error ratio might be in the order of $1.2*10^{-2}$. In certain aspects, packet loss rates of more than $10^{-2}$ are unacceptable for VoIP traffic.

Thus, for the purposes of TTI bundling, usage of only a single uplink grant and a single PHICH signal per TTI bundle would be advantageous. Also the L1 and L2 overhead may be minimized since no L2 segmentation may be required.

In certain aspects, TTI bundling may be used for UL coverage enhancements, including for example, for low data rate, medium data rate and VOIP. In an aspect, Large TTI bundling size (e.g., in order of 100 subframes) may be one possible solution to address UL coverage enhancements. In an aspect, Large TTI bundling size may be considered for DL coverage enhancements as well.

In certain aspects, in order to achieve desired coverage enhancements via TTI bundling, reliable channel estimation under low signal to noise ratio, SNR (e.g., −10 dB or lower) may be necessary. Enhancement on channel estimation may be achieved via channel estimation using multiple subframes, for example, by performing channel estimation filtering over multiple subframes.

In certain aspects, since these coverage enhancements are considered for low mobility UEs, multi-subframe channel estimation assuming similar or substantially similar channel conditions over multiple subframes may be necessary. However, multi-subframe channel estimation may require good phase continuity over multiple subframes. Otherwise, the effective channels, after combining the actual channel with any phase discontinuity, may not be substantially the same over multiple subframes. In an aspect, Phase continuity may be more pronounced when the number of subframes in TTI bundling is large.

In certain aspects, if there are power/timing/frequency variations over different subframes, maintaining phase continuity may be difficult. For example, in half-duplex UEs, if there is at least one DL reception in between two UL transmissions, it may be very difficult to maintain phase continuity for the two UL transmissions (since the half-duplex UE generally has to shut down UL transmissions in order to receive DL free of UL interference).

Certain aspects propose solutions to facilitate phase continuity for TTI bundling. A first proposal may include, maintaining, for both frequency division duplex (FDD) and time division duplex (TDD) systems, the same transmit power, timing and/or frequency over a subset of UL subframes (denoted as a "segment") of the same TTI bundle as much as possible. A bundle may contain one or more segments.

In certain aspects, a segment may be defined as coherent channel estimation interval assumed by the eNB, the size and/or boundary of which may be explicitly signaled to the UE or implicitly determined by the UE semi-statically or dynamically. In an aspect, by default (e.g., no signaling), a segment may be assumed to be the entire set of UL subframes in the same bundle (one segment in the bundle), or any other portion of it.

In certain aspects, for UL transmissions, the UE may skip monitoring, or may monitor but not apply, uplink power control commands (e.g., received in DL subframes) during each segment of the bundled transmission in order to maintain the same UL transmit power.

In alternative aspects, the UE may still keep monitoring and decoding DL subframes. For example, in one alternative, time and frequency tracking for DL reception may still be turned on and regularly updated, but time and frequency for UL transmission may be updated on a per "segment" basis of the same TTI bundle. In certain aspects, the update on timing and frequency of UL transmission across segments may be triggered by a timing advance (TA) command issued by the eNB. For example, the eNB may use TA command to signal start of a new segment (e.g., dynamic boundaries between segments or dynamic segment sizes). In an aspect, if UL transmission is drifting outside cyclic prefix (CP), instead of letting the UE keep drifting, a TA command may be used to correct timing of UL transmission. If the segment size is semi-statically configured, when the UE receives a TA command in a segment, the UE may update UL transmission timing and frequency at the next segment. In certain aspects, the update may also be done automatically by the UE at the beginning of each segment, for example, especially when the segment size/boundary is semi-statically determined.

In another alternative, time and frequency tracking for both DL and UL may be turned off within each segment. One advantage of this alternative is there is no need to manage different DL/UL time/frequencies, which may result in simpler implementation. However, some DL demodulation loss may happen due to inaccurate timing/frequency tracking for DL reception.

Figure 3:
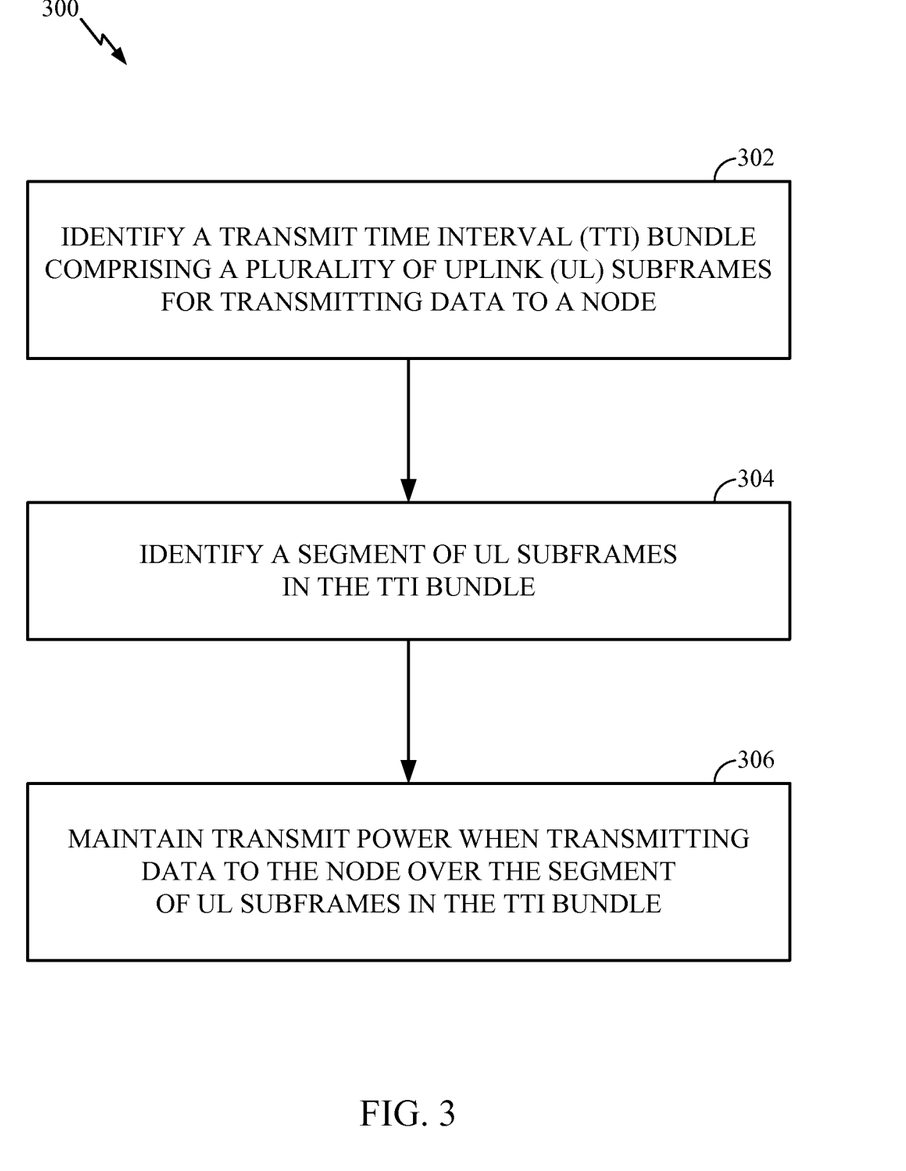
FIG. 3 illustrates example operations that may be performed by a user equipment to achieve phase continuity in a TTI bundle, in accordance with certain aspects of the present disclosure.

FIG. 3 illustrates example operations 300 that may be performed by a user equipment to achieve phase continuity in a TTI bundle, in accordance with certain aspects of the present disclosure. At 302, the UE may identify a TTI bundle comprising a plurality of UL subframes for transmitting data to a node. At 304, the UE may identify a segment of UL subframes in the TTI bundle. At 306, the UE may maintain transmit power when transmitting data to the node over the segment of UL subframes in the TTI bundle. In an aspect, the node may include a base station. In alternative aspects, the node may include a UE.

In certain aspects, the segment of the UL subframes may correspond to an assumed coherent estimation interval.

In certain aspects, the segment of UL subframes may correspond to the plurality of UL subframes in the TTI bundle. In certain aspects a size of the segment may be semi-statically configured.

In certain aspects, the UE may maintain transmit power over the segment of UL subframes by at least one of skipping monitoring uplink power control commands, or monitoring but skipping applying the uplink power control commands.

In certain aspects, the UE may maintain at least one of timing or frequency over the segment of UL subframes in the TTI bundle. In an aspect, the UE may maintain the at least one of timing or frequency over the segment by updating UL transmission and frequency on a per segment basis of the same TTI bundle. In an aspect, an update on UL timing and frequency across segments may be triggered by a timing advance (TA) command issued by the node. In an aspect, the TA command may signal a start of a new segment. In an aspect, segment size may be semi-statically configured, and the UE may update UL timing and frequency in a next segment after receiving a TA command.

In certain aspects, the UE may disable time and frequency tracking for both DL and UL within each segment. In certain aspects, the UE may ignore reception of downlink subframes for duration of the TTI bundle.

In certain aspects, the UE may determine whether to maintain transmit power over the segment based at least in part on a signal received from the node. In an aspect, the signal received from the node may include a one bit signal to enable maintaining transmit power over the segment. In an aspect, the signal may be cell-specific. In an aspect, the signal may be semi-static.

In certain aspects, the UE may determine whether to maintain transmit power during the segment based at least in part on the size of the bundle. In an aspect, the UE may determine to maintain transmit power if the size of the bundle is larger than a threshold. In an aspect, the UE may determine whether to maintain transmit power based on time division duplex (TDD) downlink/uplink subframe configuration.

In a second proposal to facilitate UL phase continuity for TTI bundling, for both FDD and TDD systems, the UE may not be required to receive DL transmissions for the entire duration over all UL subframes in the same TTI bundling.

This scenario may be more useful for half-duplex UEs. As an example, a TDD DL/UL subframe configuration #1 (DSUUD, in which D stands for downlink, S stands for special, and U stands for uplink) may be considered. For a TTI bundle size, the UE may not be required to monitor DL subframes for the entire duration of the bundle (e.g., from the first UL subframe to the last UL subframe, inclusive, in the same bundle). In a way, this scheme can be viewed as an extended "half-duplex" operation driven by TTI bundling. Once the UE is in UL transmission using TTI bundling, the UE may only perform UL transmissions during the entire bundle. After finishing the bundled UL transmission, the UE may perform DL monitoring if necessary.

Figure 4:
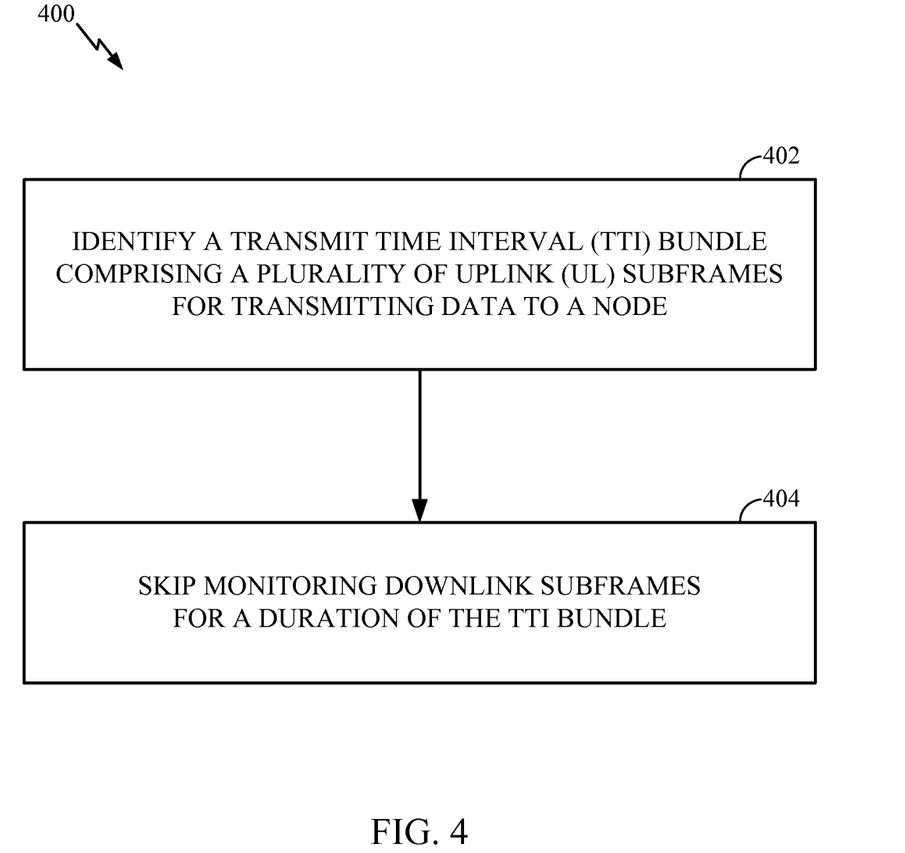
FIG. 4 illustrates example operations that may be performed by a user equipment to achieve phase continuity in a TTI bundle, in accordance with certain aspects of the present disclosure.

FIG. 4 illustrates example operations 400 that may be performed by a user equipment to achieve phase continuity in a TTI bundle, in accordance with certain aspects of the present disclosure. At 402, the UE may identify a TTI bundle comprising a plurality of uplink (UL) subframes for transmitting data to a node. At 404, the UE may skip monitoring downlink subframes for the entire duration or part of the duration (e.g., the segment discussed earlier) of the TTI bundle. In an aspect, the node may include a base station. In alternative aspects, the node may include a UE.

In certain aspects, the UE may skip monitoring downlink subframes by ignoring reception of all or at least some of downlink signals and channels.

In an aspect, the UE may be half duplex. In an aspect, the UE may transmit one or more uplink subframes in the TTI bundle to the node, and perform downlink monitoring after the duration of TTI bundle is finished. In an aspect, the UE may treat one or more downlink subframes and one or more special subframes in the TTI bundle as virtual uplink subframes. In an aspect, the UE may transmit the virtual uplink subframes with a power similar to the power of other uplink subframes in the TTI bundle.

In certain aspects, the UE may transmit uplink information in the virtual uplink subframes. In an aspect, the transmitting the uplink information in the virtual uplink subframes may include frequency multiplexing the uplink information with downlink traffic in the same subframe. In an aspect, the UE may enable a guard-band between uplink and downlink traffic in the same subframe in time division duplex to mitigate mutual interference.

Figure 5:
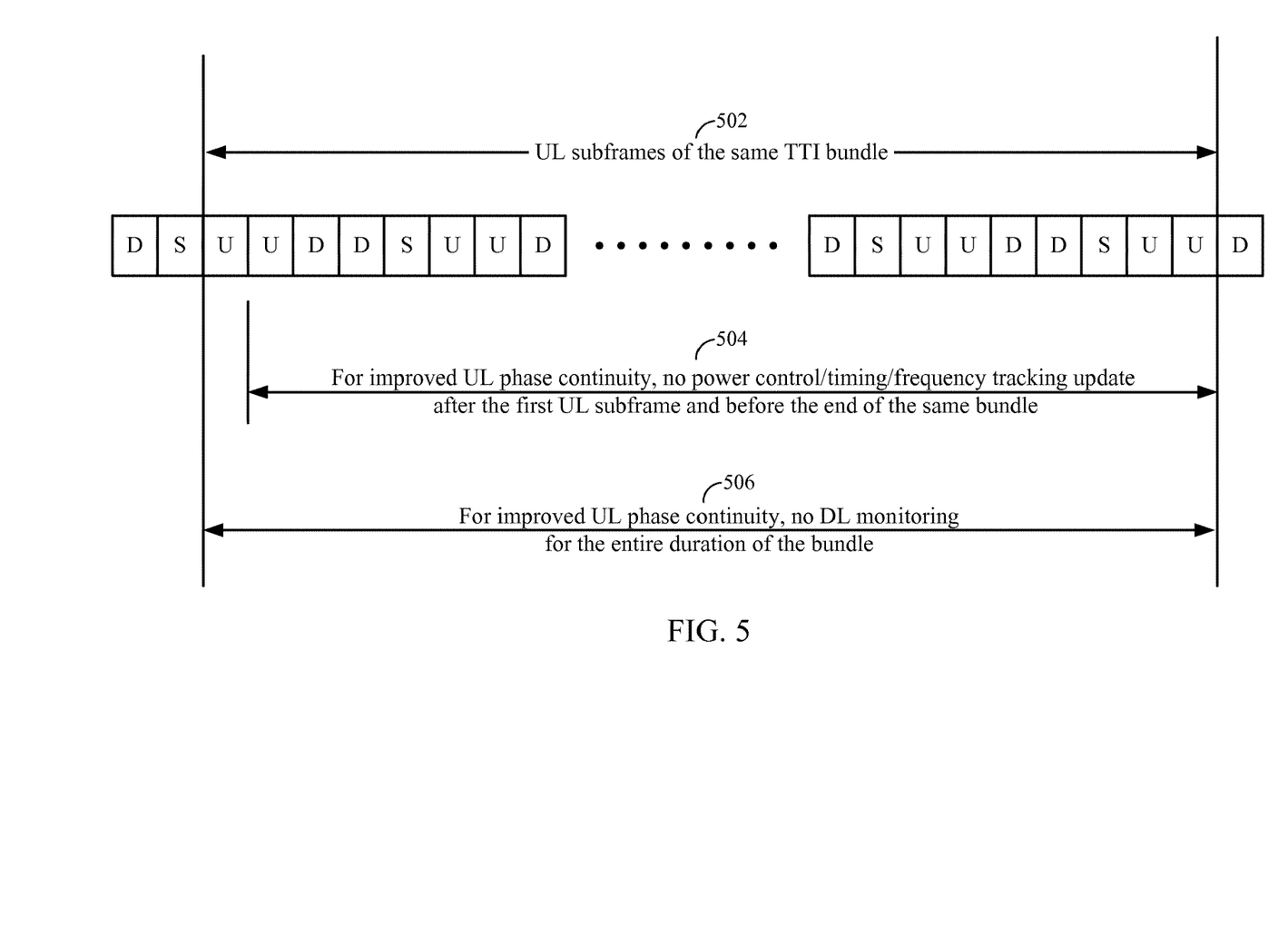
FIG. 5 illustrates example techniques for achieving UL phase continuity with TTI bundling, in accordance with certain aspects of the present disclosure.

FIG. 5 illustrates example techniques (e.g., according to the first and second proposals discussed above) for achieving UL phase continuity with TTI bundling, in accordance with certain aspects of the present disclosure. As illustrated, TTI bundle 502 includes uplink (U), downlink (D) and special (S) subframes. In an aspect, in technique 504 (in accordance with the first proposal), for improved UL phase continuity, no power control/timing/frequency tracking update may be performed after the first UL subframe and before the end of the same bundle 502. In technique 506 (in accordance with the second proposal), for improved UL phase continuity, DL monitoring may not be performed for the entire duration of the TTI bundle 502.

It may be noted that the first and second proposed schemes described above may be individually or jointly supported by a communication system to enhance uplink phase continuity.

In certain aspects, the determination of whether to perform the actions in the first or second proposals discussed above for UL transmissions in the same bundle may be based on bundling size, signaling, or both. For example, for a small bundle size, where channel estimation can be kept separate across subframes, the UE may still perform power control/timing/frequency tracking update and/or monitor DL transmissions. The UE may compare the bundling size against a known threshold to determine whether or not to skip the power updates and/or DL monitoring.

As another example, the determination may be based on signaling. For example, the signaling may include one or more bits from eNB to the UE to inform the UE that the second proposal (or the first proposal or a combination of the two proposals) may be enabled during the bundled UL transmissions.

In certain aspects, the determination may be based on both signaling and bundling size. It is possible that the bundling size may vary across UL transmissions. Some UL transmissions may use a first bundling size (e.g., equal to one subframe), while some other UL transmissions may use a second bundling size (e.g., equal to twenty subframes). The determination of skipping DL monitoring may be based on the signaling (to enable such a feature) and the bundling size for a particular UL transmission (e.g., whether it is above a threshold or not).

In certain aspects, for TDD, determination of which scheme to use may further depend on TDD DL/UL subframe configuration. For a given TTI bundling size, the time duration for which the bundled UL transmissions occur depends on the TDD DL/UL subframe configuration. For example, for a bundling size of 60 UL subframes, for TDD DL/UL #0 (DSUUUDSUUU), uplink transmissions may take ten frames. On the other hand, for TDD DL/UL #1 (DSUUDDSUUD), uplink transmission may take fifteen frames.

For certain aspects, enabling one of the schemes may be done on a per UE basis or per cell basis. The signaling may thus be UE-specific or cell-specific (e.g., via broadcast or dedicated signaling). In addition, enabling of a scheme may be semi-static (e.g., by radio resource control (RRC)). Dynamic enabling (e.g., via a control channel) may also be possible.

For certain aspects, similar design may also be applied at the eNB side for bundled DL transmissions. As an example, DL transmit power/timing/frequency tracking can be maintained by the eNB for a set of subframes in the bundled downlink transmissions such that coherent channel estimation can be performed by the UE.

Aspects of the present disclosure discussed above may also be applied to eNB side bundled DL transmissions.

In certain aspects, in cases when the UE skips DL monitoring in a TTI bundle (or a portion thereof), the DL and/or special subframes may effectively be treated as virtual UL subframes. In a virtual UL subframe, the UE may transmit with zero power (e.g., no transmission), minimal power (e.g., minimal possible power), or same power as regular UL subframes in the same bundle.

Figure 6:
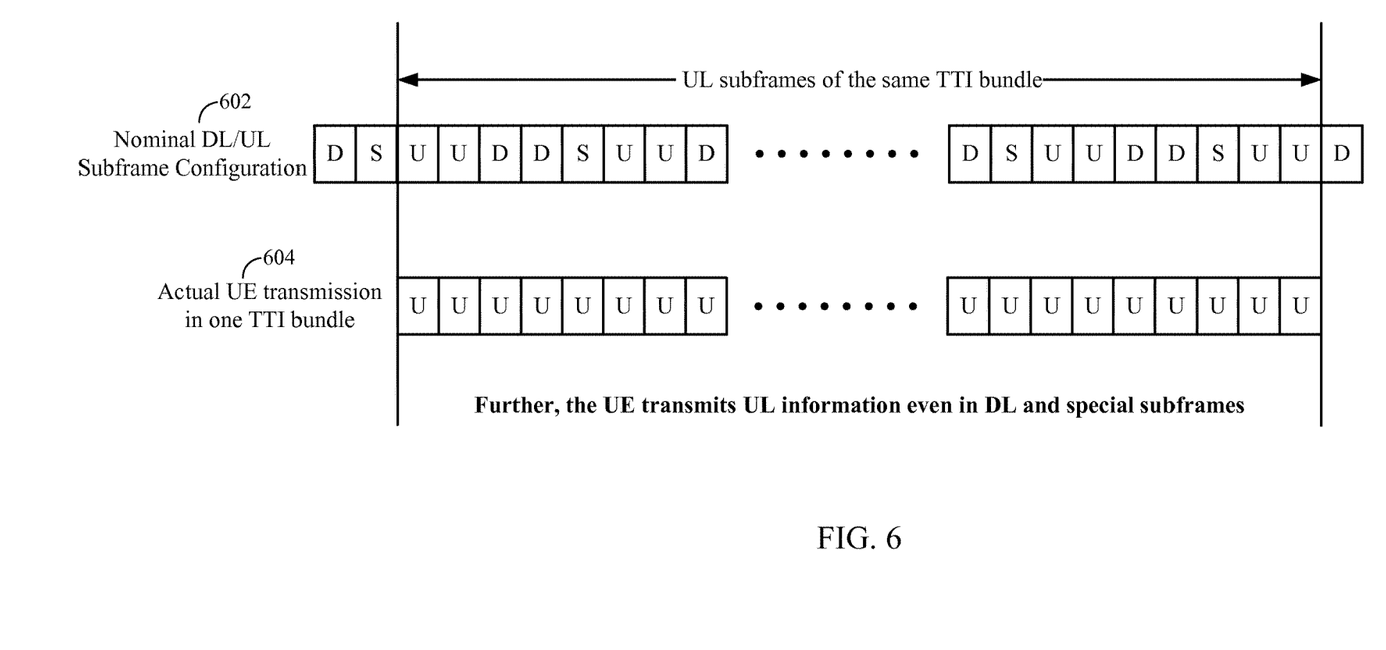
FIG. 6 illustrates an example TTI bundle in which downlink and special subframes are treated as virtual uplink subframes, in accordance with certain aspects of the present disclosure.

FIG. 6 illustrates an example TTI bundle in which downlink and special subframes are treated as virtual uplink subframes, in accordance with certain aspects of the present disclosure. As illustrated, a nominal DL/UL subframe configuration 602 may include downlink and special subframes. However, for actual UE transmissions the DL and special subframes may be treated as virtual UL subframes, and thus, the actual UE transmissions in one TTI bundle (e.g., 604) may only include uplink subframes (including both actual uplink subframes and virtual uplink subframes). As described earlier, the UE may transmit UL information in the virtual UL subframes of the TTI bundle.

In certain aspects, in a virtual UL subframe, the UE may transmit UL information as if it were an actual UL subframe part of the same bundle, or the UE may transmit some dummy UL information. In certain aspects, a virtual UL subframe may be counted as part of the bundling size, especially when it is transmitted with actual UL information and with same power as regular UL subframes. In certain aspects, a virtual UL subframe may be discounted from part of the bundling size, especially when it is transmitted with zero or minimal power or with dummy UL information.

In certain aspects, since the UE while TTI bundling typically has a small assignment size (e.g., one RB or less), it may be possible to allow UL transmission in a DL subframe or a special subframe, which is frequency multiplexed with DL traffic in the same subframe.

Figure 7:
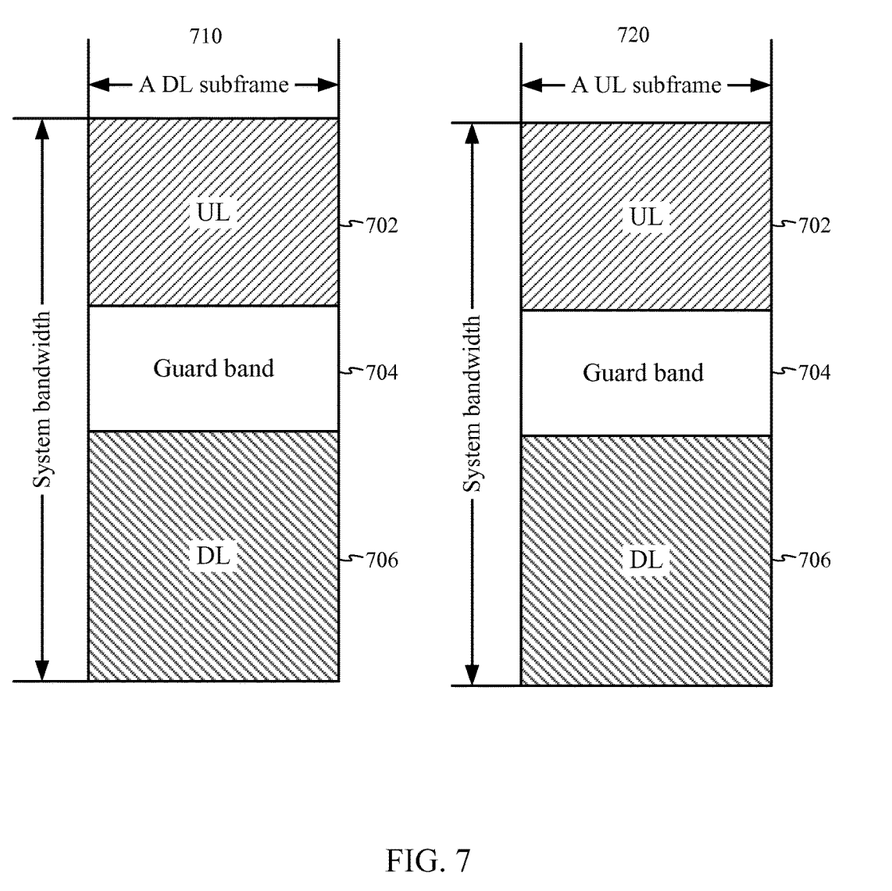
FIG. 7 illustrates example uplink and downlink subframes including frequency multiplexed uplink and downlink traffic, in accordance with certain aspects of the present disclosure.

FIG. 7 illustrates example uplink and downlink subframes including frequency multiplexed uplink traffic 702 and downlink traffic 706, in accordance with certain aspects of the present disclosure. A guard band 704 may be enabled between UL and DL traffic in the same subframe in TDD to mitigate mutual interference. Such an idea may be applied to a DL subframe (710) and/or an UL subframe (720), in which both DL and UL transmissions may be allowed. However, this may create a lot of complexity if the UL and DL have to be processed by the same node (e.g., eNB to receive UL and to transmit DL in the same subframe), making it very difficult for practical use. This may imply that the entire DL subframe may not contain any DL transmissions if the subframe is treated as a virtual UL subframe by some UEs.

The various operations of methods described above may be performed by various hardware and/or software/firmware component(s) and/or module(s) corresponding to operations/techniques/means-plus-function blocks illustrated in the Figures. The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software/firmware module executed by a processor, or in a combination thereof. A software/firmware module may reside in any form of storage medium that is known in the art. Some examples of storage media that may be used include random access memory (RAM), read only memory (ROM), flash memory, EPROM memory, EEPROM memory, phase change memory (PCM), registers, a hard disk, a removable disk, a CD-ROM and so forth. A software/firmware module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software/firmware, or combinations thereof. If implemented in software/firmware, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software/firmware instructions may also be transmitted over a transmission medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications by a user equipment (UE), comprising:
    identifying a transmit time interval (TTI) bundle comprising a plurality of uplink (UL) subframes for transmitting to a node;
    identifying a segment of UL subframes in the TTI bundle; and
    maintaining a same transmit power in all uplink subframes of the segment when transmitting to the node over the segment of UL subframes in the TTI bundle.

2. The method of claim 1, wherein the segment of UL subframes corresponds to an assumed coherent estimation interval.

3. The method of claim 1, wherein the segment of UL subframes corresponds to the plurality of UL subframes in the TTI bundle.

4. The method of claim 1, wherein a size of the segment is semi-statically configured.

5. The method of claim 1, further comprising maintaining at least one of timing or frequency over the segment of UL subframes in the TTI bundle.

6. The method of claim 5, wherein maintaining the at least one of timing or frequency over the segment of UL subframes in the TTI bundle comprises updating UL transmission and frequency on a per segment basis of the same TTI bundle.

7. The method of claim 6, wherein an update on UL timing and frequency across segments is triggered by a timing advance (TA) command issued by the node.

8. The method of claim 7, wherein the TA command signals a start of a new segment.

9. The method of claim 7, wherein:
    segment size is semi-statically configured; and
    the UE updates the UL timing and frequency in a next segment after receiving the TA command.

10. The method of claim 1, further comprising disabling time and frequency tracking for both downlink (DL) and UL within each segment.

11. The method of claim 1, further comprising determining whether to maintain the same transmit power over the segment based at least in part on a signal received from the node.

12. The method of claim 11, wherein the signal received from the node comprises a one bit signal to enable maintaining the same transmit power over the segment.

13. The method of claim 11, wherein the signal is cell-specific.

14. The method of claim 11, wherein the signal is semi-static.

15. The method of claim 1, further comprising determining whether to maintain the same transmit power over the segment based at least in part on a size of the TTI bundle.

16. The method of claim 15, further comprising determining to maintain the same transmit power if the size of the TTI bundle is larger than a threshold.

17. The method of claim 15, further comprising:
    determining whether to maintain the same transmit power based at least in part on a time division duplex (TDD) downlink/uplink subframe configuration.

18. An apparatus for wireless communications by a user equipment (UE), comprising:
    at least one processor configured to:
        identify a transmit time interval (TTI) bundle comprising a plurality of uplink (UL) subframes for transmitting to a node;

identify a segment of UL subframes in the TTI bundle; and maintain a same transmit power in all uplink subframes of the segment when transmitting to the node over the-segment of UL subframes in the TTI bundle; and a memory coupled to the at least one processor.

19. An apparatus for wireless communications by a user equipment (UE), comprising:

means for identifying a transmit time interval (TTI) bundle comprising a plurality of uplink (UL) subframes for transmitting to a node;

means for identifying a segment of UL subframes in the TTI bundle; and means for maintaining a same transmit power in all uplink subframes of the segment when transmitting to the node over the segment of UL subframes in the TTI bundle.

20. A non-transitory computer-readable medium for wireless communications by a user equipment (UE), comprising code, which when executed by at least one processor, causes the UE to:

identify a transmit time interval (TTI) bundle comprising a plurality of uplink (UL) subframes for transmitting to a node;

identify a segment of UL subframes in the TTI bundle; and maintaining a same transmit power in all uplink subframes of the segment when transmitting to the node over the segment of UL subframes in the TTI bundle.

* * * * *